(12) United States Patent
Tawada

(10) Patent No.: US 9,704,505 B2
(45) Date of Patent: Jul. 11, 2017

(54) AUDIO SIGNAL PROCESSING APPARATUS AND METHOD

(71) Applicant: CANON KABUSHIKI KAISHA, Tokyo (JP)

(72) Inventor: Noriaki Tawada, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 98 days.

(21) Appl. No.: 14/527,682

(22) Filed: Oct. 29, 2014

(65) Prior Publication Data

US 2015/0139446 A1 May 21, 2015

(30) Foreign Application Priority Data

Nov. 15, 2013 (JP) ................................. 2013-237353

(51) Int. Cl.
*G10L 21/00* (2013.01)
*G10L 21/0208* (2013.01)
*G10L 21/0216* (2013.01)
*G10L 21/038* (2013.01)
*G10L 15/20* (2006.01)
(Continued)

(52) U.S. Cl.
CPC .......... *G10L 21/0208* (2013.01); *G10L 15/20* (2013.01); *G10L 21/0216* (2013.01); *G10L 21/0232* (2013.01); *G10L 21/038* (2013.01); *H04S 7/40* (2013.01)

(58) Field of Classification Search
CPC ............. G10L 21/0208; G10L 21/0232; G10L 21/0308; G10L 25/18; G10L 21/0272; G10L 21/02; G10L 21/06; G10L 2021/02166; G10L 25/84; G10L 21/0216; G10L 15/20; G10L 15/00; G10L 15/28; G10L 21/00; G10L 2021/02165; G10L 2021/0135; G10L 25/90; G10L 13/06; H04R 1/40; H04R 3/00; H04R 29/00; H04R 3/005; H04R 5/04; H04S 7/305; H04S 7/00; H04S 5/02; H04S 7/30; H04S 1/002; H04S 7/40; G01H 7/00; G01H 3/00; G01H 17/00; G10K 11/16; G10K 15/00; G10K 21/013; G01S 3/8083; H03G 3/00; H03G 5/00;
(Continued)

(56) References Cited

U.S. PATENT DOCUMENTS 4,559,569 A * 12/1985 Otsuki ................... H03G 5/165
333/28 R
5,812,970 A * 9/1998 Chan .................... G10L 21/0208
381/94.3
(Continued)

FOREIGN PATENT DOCUMENTS

JP 2009-128906 A 6/2009
JP 2012-022120 A 2/2012

*Primary Examiner* — Vivian Chin
*Assistant Examiner* — Ubachukwu Odunukwe
(74) *Attorney, Agent, or Firm* — Fitzpatrick, Cella, Harper & Scinto

(57) ABSTRACT

An audio separating apparatus obtains a matrix by performing time-frequency conversion on an input audio signal. The audio separating apparatus divides the obtained matrix into at least a basis matrix and an activity matrix, and classifies base spectra that configure the respective columns of the basis matrix into first base spectra corresponding to a target sound and second base spectra corresponding to a non-target sound.

14 Claims, 11 Drawing Sheets

(51) Int. Cl.
*H04S 7/00* (2006.01)
*G10L 21/0232* (2013.01)

(58) Field of Classification Search
CPC .... G10H 1/20; G10H 2210/066; G10H 3/125; G10H 1/08; G10H 2250/031; H04B 1/665
USPC ... 381/92, 94.2, 94.1, 94.3, 94.7, 56, 57, 58, 381/59, 103, 71.11, 71.1, 71.14, 94.9; 73/579; 704/205, 233, 226, 227, 228, 704/204, 500, E21.002, 212, 200, 201, 704/203, 254, 208; 702/190; 382/173; 345/600; 348/118; 370/206; 340/856.3
See application file for complete search history.

(56) References Cited

U.S. PATENT DOCUMENTS

| | | | |
|---|---|---|---|
| 8,015,003 B2* | 9/2011 | Wilson | G10L 21/0208 704/226 |
| 8,498,863 B2* | 7/2013 | Wang | G10L 21/0272 704/200 |
| 8,532,308 B2 | 9/2013 | Tawada | |
| 9,093,056 B2* | 7/2015 | Pardo | H04S 7/40 |
| 2010/0138010 A1* | 6/2010 | Aziz Sbai | G10H 1/0008 700/94 |
| 2012/0063605 A1 | 3/2012 | Tawada | |
| 2012/0136655 A1* | 5/2012 | Yamabe | G10L 25/90 704/207 |
| 2013/0035933 A1* | 2/2013 | Hirohata | G10L 15/20 704/206 |
| 2014/0122068 A1* | 5/2014 | Hirohata | G10L 15/20 704/233 |
| 2014/0185826 A1 | 7/2014 | Tawada | |
| 2015/0262590 A1* | 9/2015 | Joder | G10L 21/0232 704/201 |

* cited by examiner

F I G. 2A
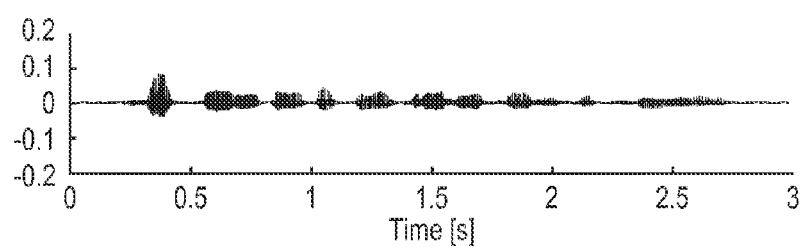
F I G. 2B
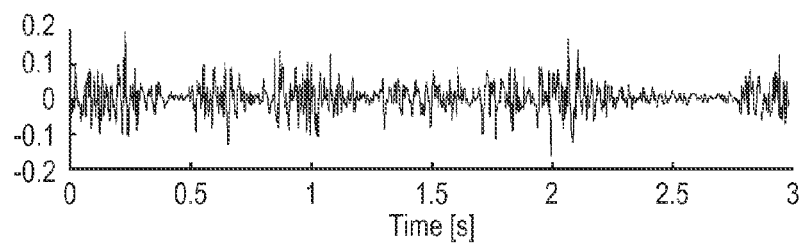
F I G. 2C
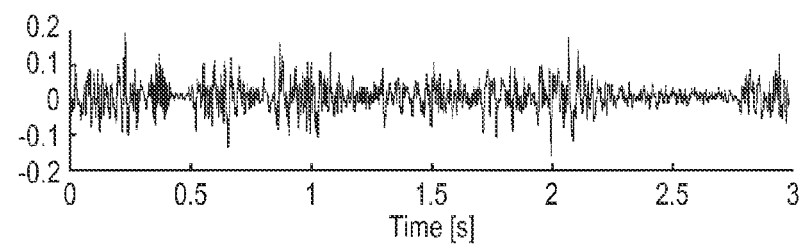
F I G. 2D
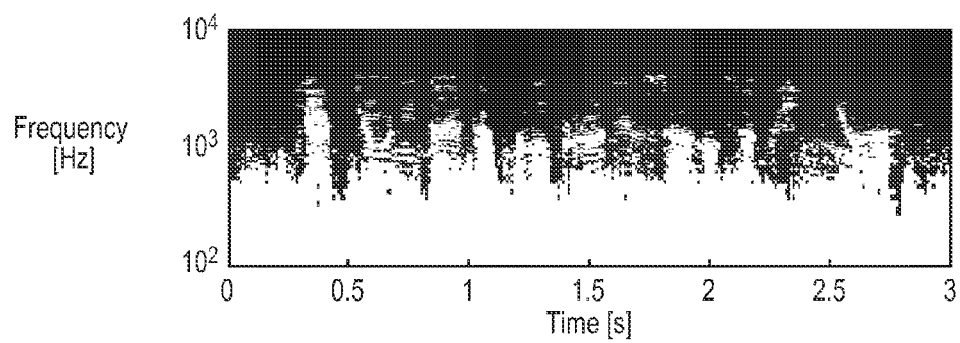

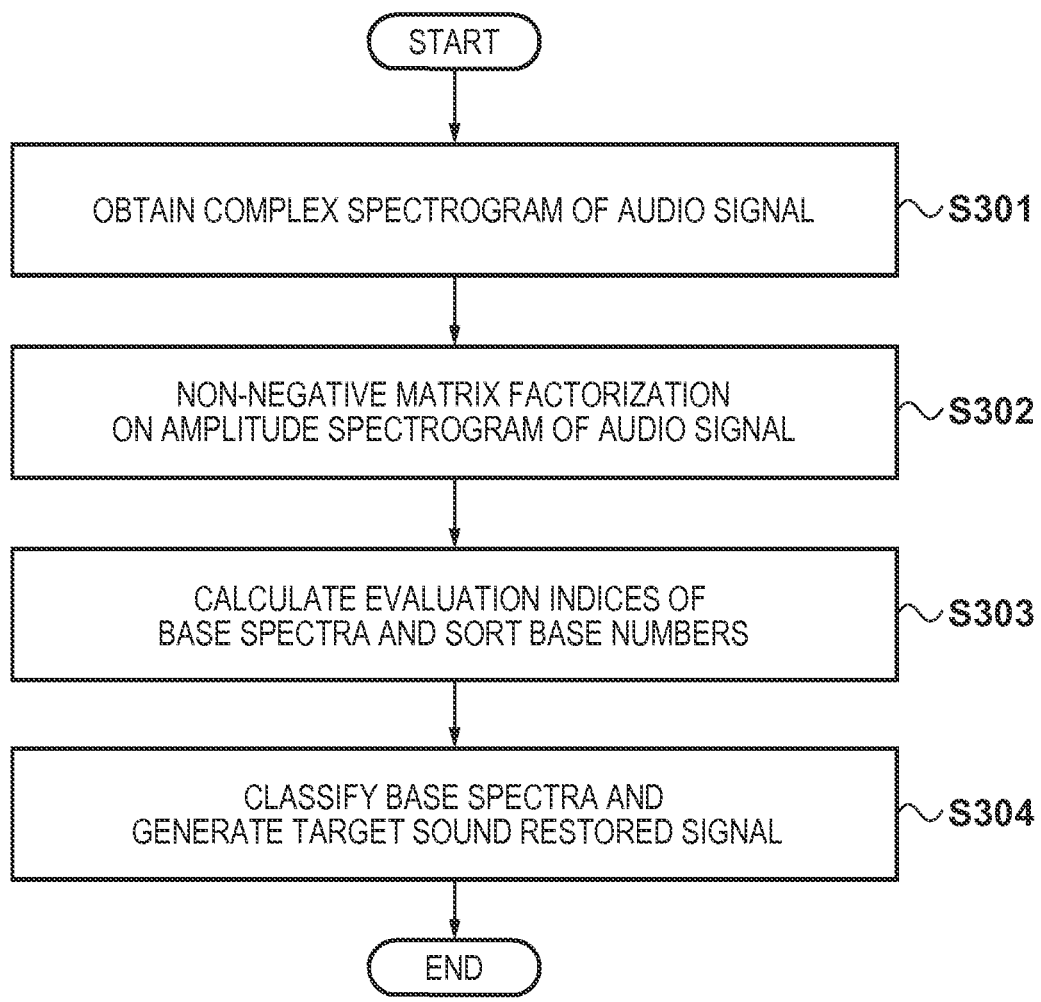

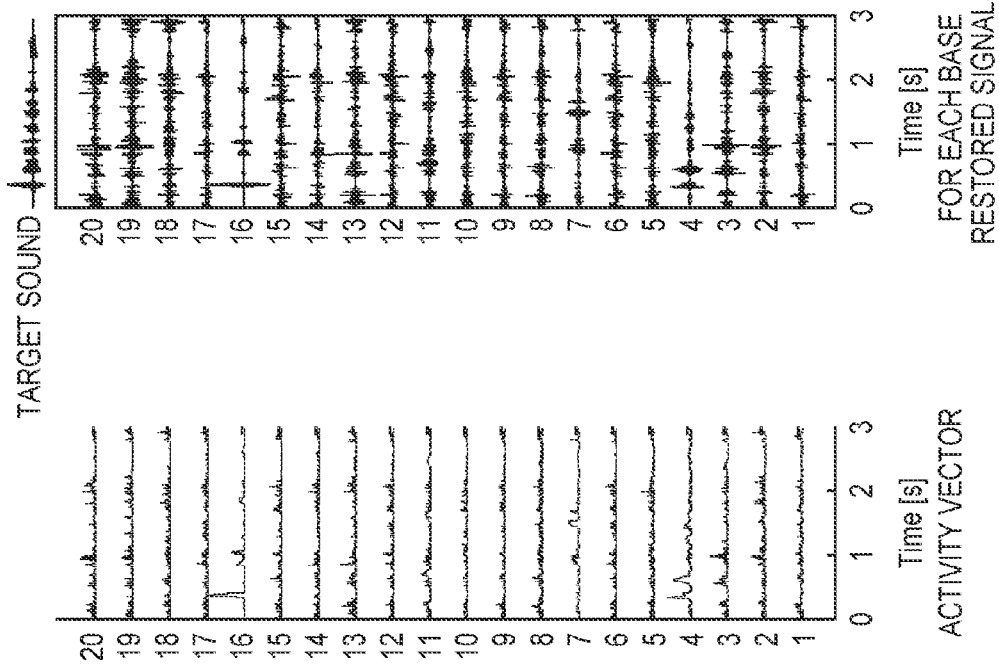
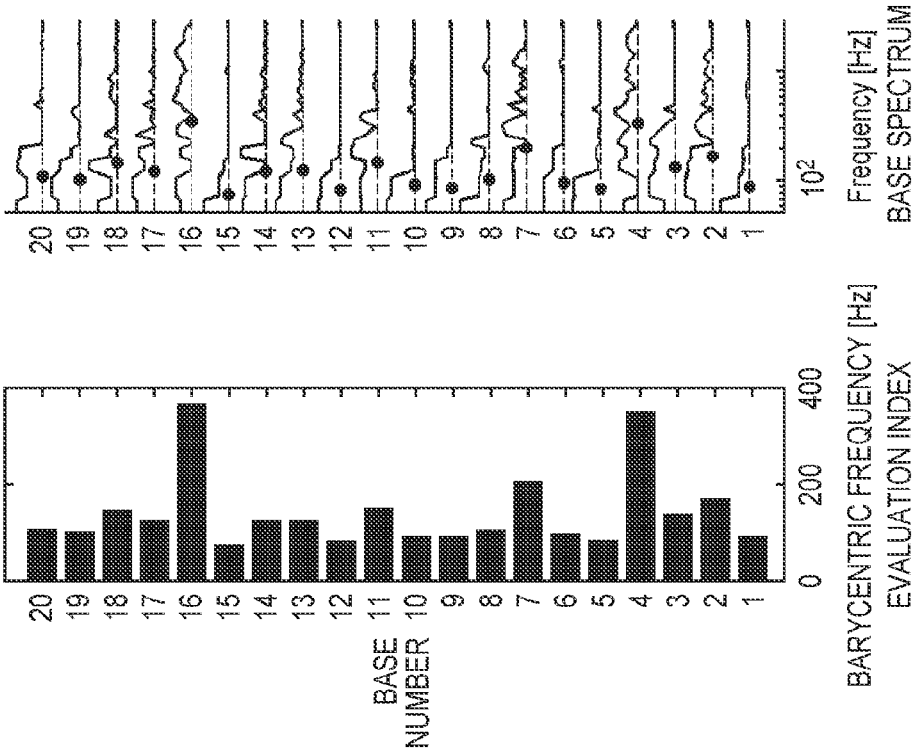
F I G. 4A    F I G. 4B    F I G. 4C    F I G. 4D

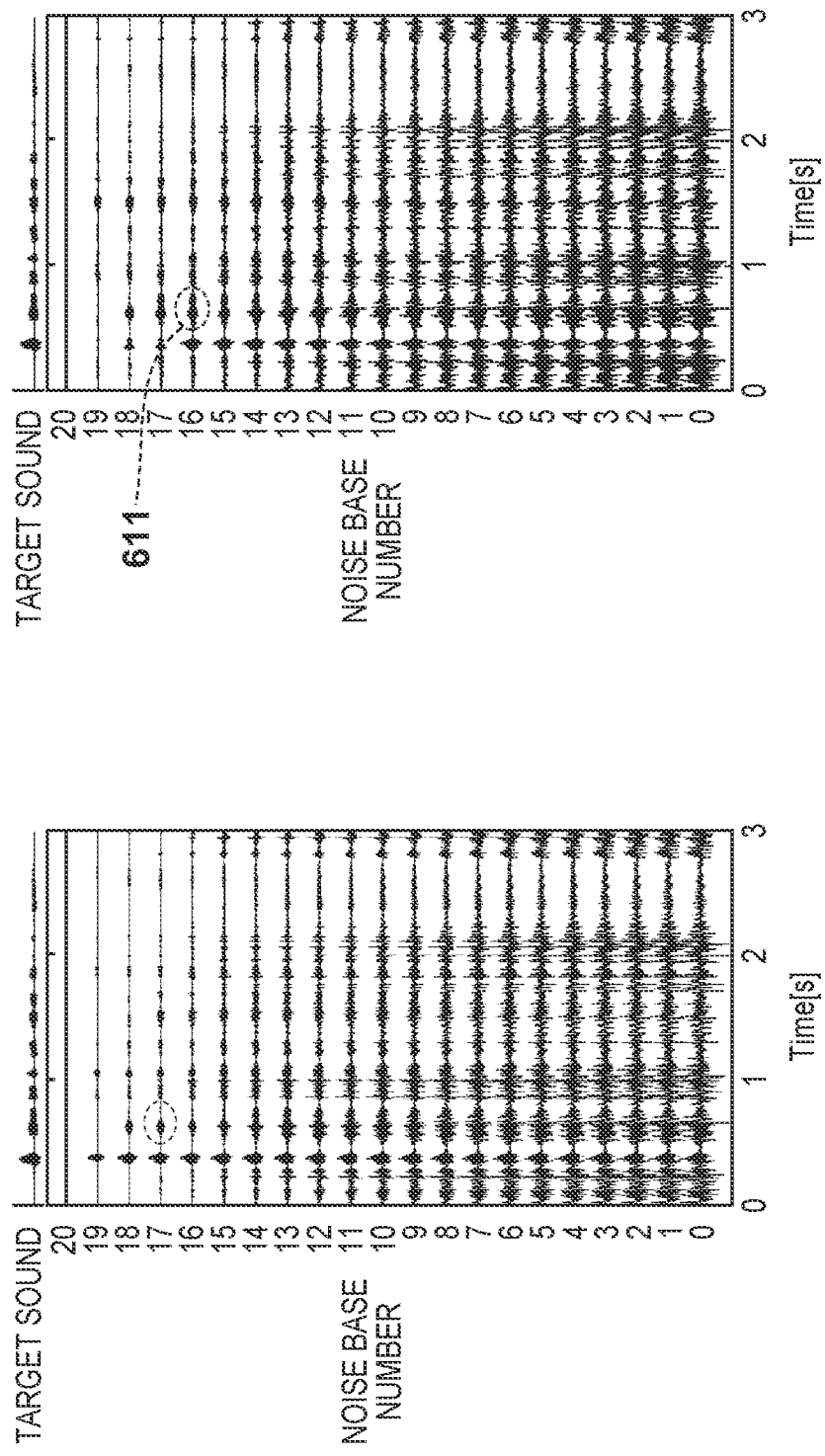

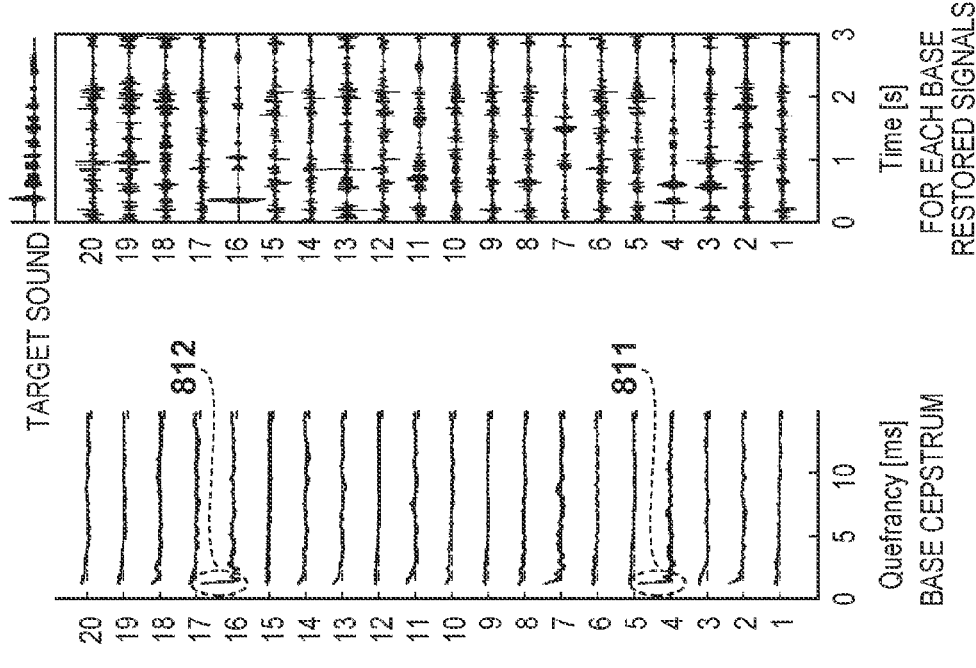
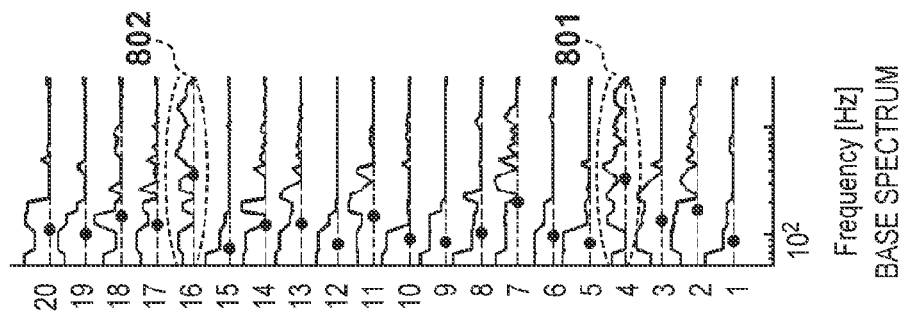
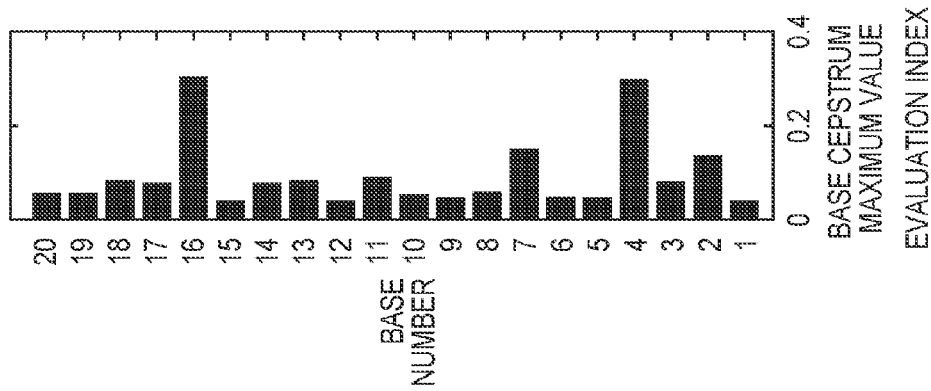
FIG. 8A   FIG. 8B   FIG. 8C   FIG. 8D

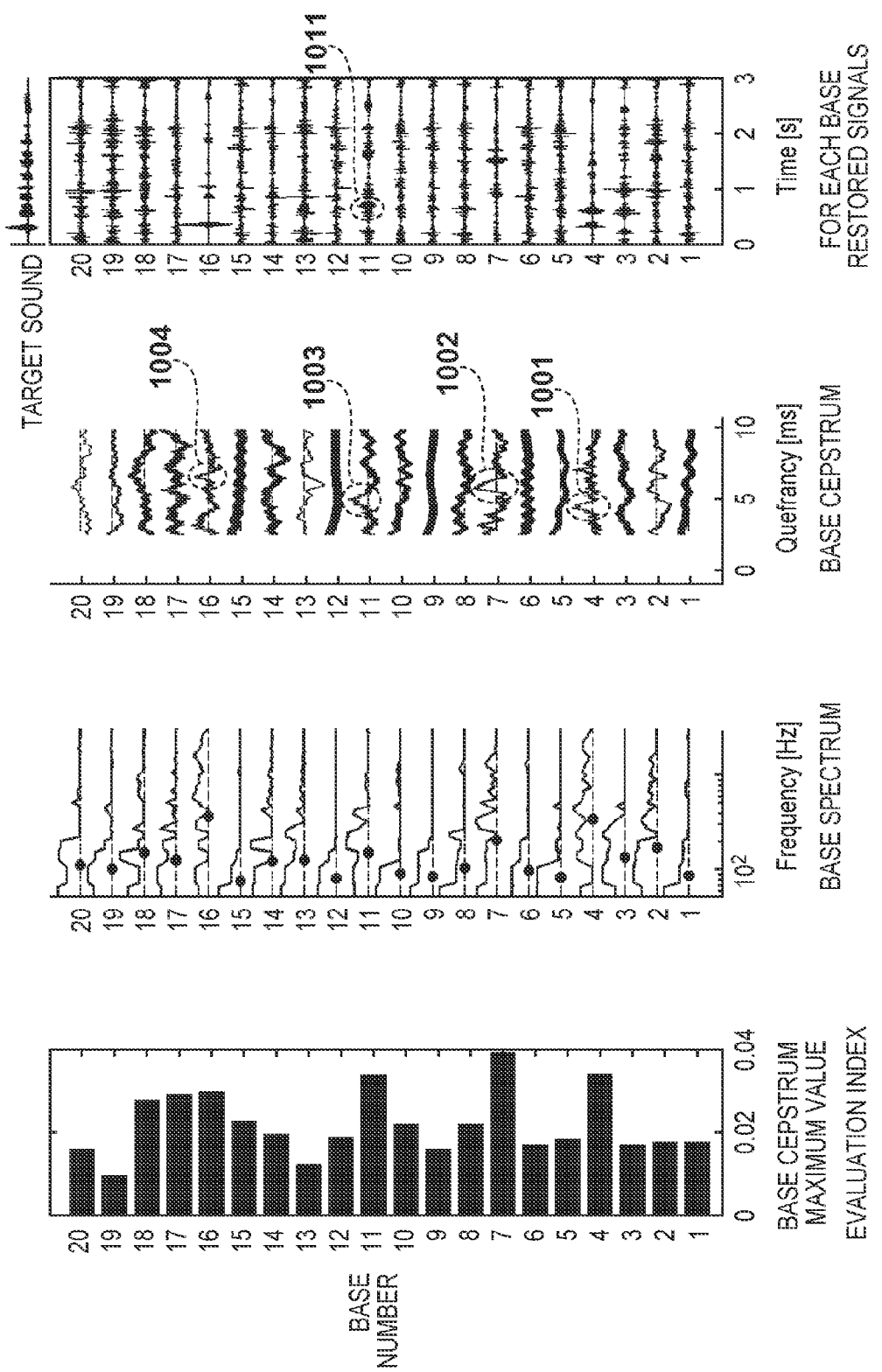

F I G. 11A
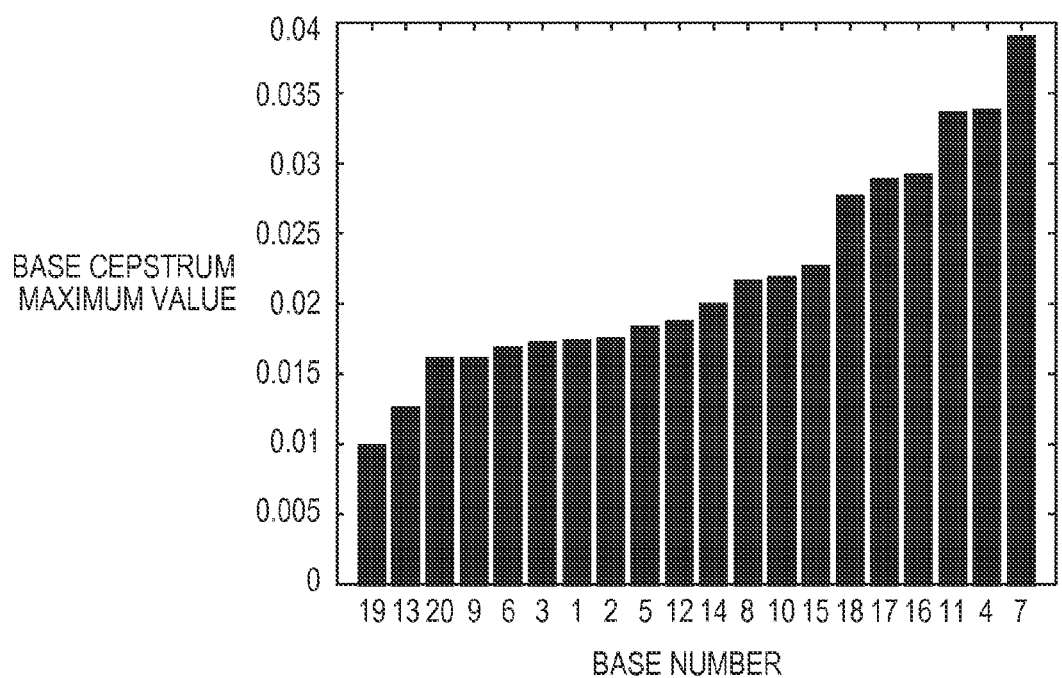
F I G. 11B
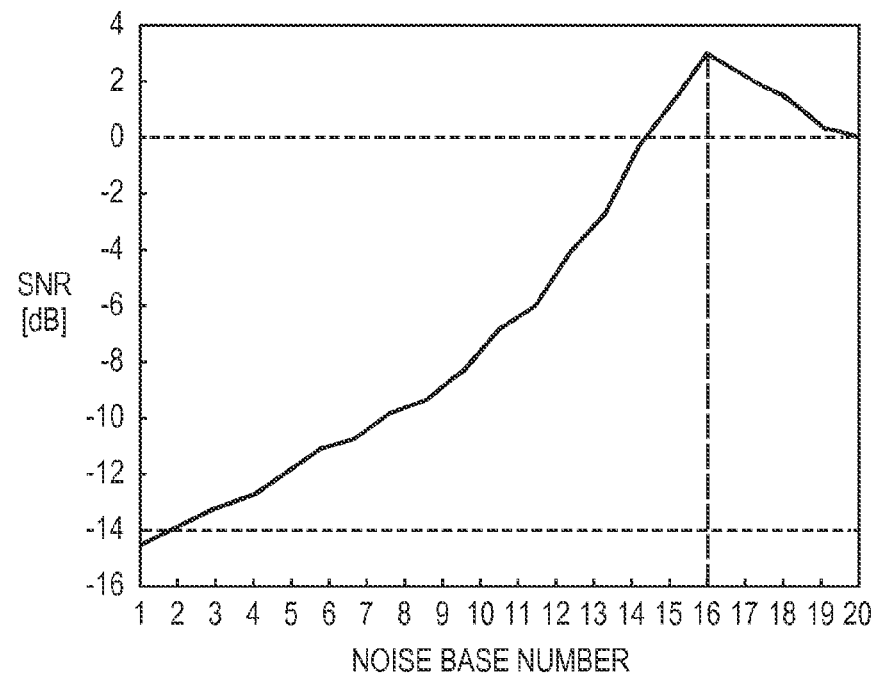

AUDIO SIGNAL PROCESSING APPARATUS AND METHOD

BACKGROUND OF THE INVENTION

Field of the Invention

The present invention relates to audio signal processing apparatuses and methods that divide audio signals into a plurality of audio signals such as target sound and noise, for example.

Description of the Related Art

Techniques for removing noise, which is a non-target sound, from an audio signal improve the audibility of a target sound present in the audio signal, and are important techniques for improving recognition rates in voice recognition.

Non-negative matrix factorization is used as a technique for removing noise from audio signals. This is based on the assumption that a matrix obtained by performing a time-frequency conversion on an audio signal is split into a basis matrix and an activity matrix by the non-negative matrix factorization, and these matrices will be divided into a partial matrix for target sounds and a partial matrix for noise. Then, a target sound-restored signal from which noise has been removed is generated using a target sound basis matrix, which is a partial basis matrix for the target sound and a target sound activity matrix, which is a partial activity matrix for the target sound.

According to one past technique, target sound and noise are prepared separately from an audio signal from which noise is to be removed, and by training these in advance, a teacher basis matrix and a teacher activity matrix are obtained for both the target sound and the noise. Then, the target sound-restored signal is obtained by analyzing the matrix obtained through time-frequency conversion on an audio signal using statistical amount information of the teacher basis matrix and the teacher activity matrix.

According to another past technique, two matrices are obtained by performing time-frequency conversion on both channels in a two-channel audio signal, and non-negative matrix factorization is then carried out on the obtained matrices. Then, among the base spectra that configure the respective columns in each basis matrix, spectra with high interchannel correlation are taken as noise base spectra and other spectra are taken as target sound base spectra. The target sound-restored signal is generated using a target sound basis matrix configured of the target sound base spectra and a target sound activity matrix corresponding thereto.

According to the first technique mentioned above, the basis matrix is trained in advance from sounds prepared separately, and the restored signal is then generated using that basis matrix. This is thought to be useful for separating musical instrument sounds in cases where the shape (harmonic structure) of the base spectrum is generally fixed, like scales in harmonic instruments (for example, for use in automatic transcription). However, in other cases, it is possible that the restored signal will be generated using a base spectrum that is different from the sounds in the audio signal to be separated, and this technique can therefore lead to a drop in the audio quality.

The second technique described above obtains a basis matrix from an audio signal from which noise is to be removed, and a target sound-restored signal can likely be generated using the base spectrum corresponding to the actual target sound as long as the target sound basis matrix and the noise basis matrix can be separated well. However, the target sound base spectra and noise base spectra are classified based on interchannel correlation, which requires a multichannel audio signal.

Meanwhile, correlation corresponds to an amount calculated using a set of two base spectra, and a Euclidian distance, an inner product, and so on between the base spectra is used. However, such a simple correlation index does not provide a clear physical meaning and is not necessarily suited to the classification of base spectra.

SUMMARY OF THE INVENTION

Having been achieved to solve the aforementioned problems, an embodiment of the present invention provides an audio signal processing apparatus and control method capable of classifying respective base spectra of an audio signal with a high level of accuracy.

According to one aspect of the present invention, there is provided an audio signal processing apparatus comprising: a separating unit configured to separate an audio signal into a plurality of base spectra and activities that correspond to respective base spectra; and a classifying unit configured to classify the base spectra into first base spectra corresponding to a target sound and second base spectra corresponding to a non-target sound based on a distribution of the base spectra along a frequency axis.

Also, according to another aspect of the present invention, there is provided a control method for an audio signal processing apparatus, the method comprising: a separating step of separating an audio signal into a plurality of base spectra and activities that correspond to respective base spectra; and a classifying step of classifying the base spectra into first base spectra corresponding to a target sound and second base spectra corresponding to a non-target sound based on a distribution of the base spectra along a frequency axis.

Further features of the present invention will become apparent from the following description of exemplary embodiments (with reference to the attached drawings).

BRIEF DESCRIPTION OF THE DRAWINGS

FIGS. 2A to 2D are diagrams illustrating an audio signal and amplitude spectrograms.

FIG. 3 is a flowchart illustrating an audio separation process according to an embodiment.

FIGS. 4A to 4D are diagrams illustrating a base spectrum evaluation index according to a first embodiment.

FIGS. 6A and 6B are diagrams illustrating a target sound-restored signal according to an embodiment.

FIGS. 8A to 8D are diagrams illustrating a base spectrum evaluation index according to a second embodiment.

FIGS. 10A to 10D are diagrams illustrating a base spectrum evaluation index according to a third embodiment.

FIGS. 11A and 11B are diagrams illustrating the sorting of base numbers and the SNR of a target sound-restored signal according to the third embodiment.

DESCRIPTION OF THE EMBODIMENTS

Figure 1:
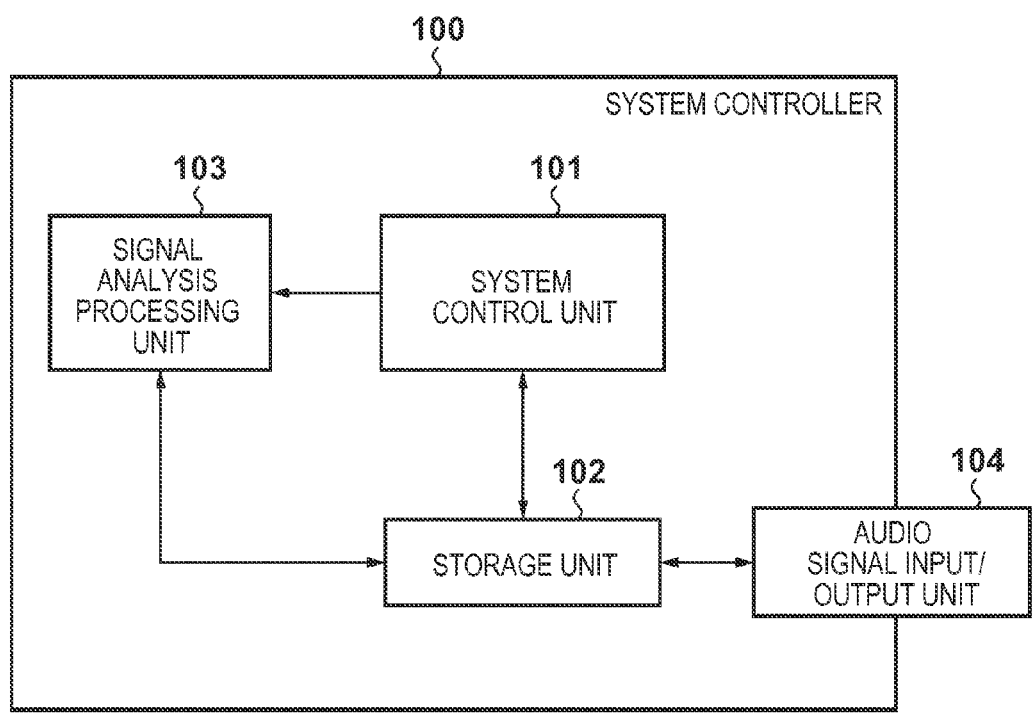
FIG. 1 is a block diagram illustrating a sound source separation apparatus according to an embodiment.

Preferred embodiments of the present invention will be described hereinafter in detail with reference to the appended drawings. It should be noted that the configurations described in the following embodiments are merely examples, and that the present invention is not intended to be limited to the configurations described therein and illustrated in the drawings.

First Embodiment

FIG. 1 is a block diagram illustrating an example of the configuration of a sound source separation apparatus serving as an audio signal processing apparatus according to the first embodiment. The sound source separation apparatus shown in FIG. 1 includes a system control unit 101 that controls all constituent elements, a storage unit 102 that stores various types of data, and a signal analysis processing unit 103 that analyzes signals, within a main system controller 100. The system controller 100 further includes an audio signal input/output unit 104 for inputting/outputting audio signals.

In the sound source separation apparatus shown in FIG. 1, an audio signal is input via the audio signal input/output unit 104 from an external storage medium, a network, or the like, and is recorded into the storage unit 102. Here, "audio signal" refers to a mixed sound in which noise that is to be removed is intermixed with a target sound. Note that signal obtained by performing amplification and A/D conversion on a microphone signal recorded by a microphone (not shown), for example, may be input as the audio signal and recorded continuously into the storage unit 102.

In the first embodiment, a mixed sound such as that shown in FIG. 2C, in which speech, serving as a target sound and indicated in FIG. 2A, and wind noise, serving as noise and indicated in FIG. 2B, are intermixed, serves as the audio signal from which noise is to be removed. The following will focus on the signal analysis processing unit 103, and a noise removal process is carried out according to the flowchart shown in FIG. 3. Note that the flowchart in FIG. 3 is assumed to be a process carried out for every predetermined time block length of the audio signal, and in the first embodiment, the time block length is assumed to be three seconds.

In S301, the signal analysis processing unit 103 obtains a time block length of the audio signal from the audio signal input through the audio signal input/output unit 104 and stored in the storage unit 102, performs time-frequency conversion thereon, and obtains a complex spectrogram Y of the audio signal. Specifically, the audio signal is cut out at predetermined time frame lengths that are shorter than the time block length, and a complex Fourier coefficient is then obtained by executing a Fourier transform thereon. At this time, the cut-out time frames are shifted by half a time frame length, and the time resolution and frequency resolution in the time-frequency conversion are determined by the time frame length. Taking a number of time frames in the time block as T and a number of frequency divisions up to the Nyquist frequency as F, F×T complex Fourier coefficients are obtained through the aforementioned processing. The complex spectrogram Y is a complex matrix having a size {F×T}, whose elements are the stated Fourier coefficients. Note that it is preferable to carry out windowing on time signals before the Fourier transform, and windowing is also carried out after using an inverse Fourier transform to restore the time signal. As such, a sine window is used for the window function, in consideration of reconstruction conditions in which windowing is carried out twice on time frames that overlap by 50% each.

Next, in S302, the signal analysis processing unit 103 finds a basis matrix H and an activity matrix U of an amplitude spectrogram |Y| of the audio signal through non-negative matrix factorization. The amplitude spectrogram |Y| is a non-negative matrix having the absolute values of complex numbers for each element in the complex spectrogram Y obtained in S301.

FIG. 2D illustrates an amplitude spectrogram of the audio signal in FIG. 2C. Here, the amplitude values are binary, with white indicating high values and black indicating low values. It can be seen in FIG. 2D that the wind noise is prevalent in low bands, whereas bands caused by the harmonic components of speech can be seen in the mid and high bands.

Taking the number of bases specified during non-negative matrix factorization as K, the {F×T} size amplitude spectrogram |Y| can be split into the {F×K} size basis matrix H and the {K×T} size activity matrix U, as indicated by Formula (1). Here, "·" indicates the product of the matrices (including vectors and scalars).

$$|Y| \approx H \cdot U \quad (1)$$

An expression based on a standard indicating the degree of divergence of (H·U) from |Y| may be used as an update expression for H and U in the convergent calculation in Formula (1). The Euclidian distance (square error), a generalized Kullback-Leibler divergence, the Itakura-Saito distance, and so on can be given as examples of standards indicating the degree of divergence in a matrix.

When non-negative matrix factorization is carried out on the amplitude spectrogram |Y| shown in FIG. 2D with a base number K of 20, for example, a {F×20} size basis matrix H and a {20×T} size activity matrix U are obtained. FIG. 4B illustrates 20 {F×1} size base spectra that configure the respective columns of the basis matrix H in a normalized state, with the numbers on the vertical axis indicating the base numbers. Note that the frequency axis is a logarithm based on the human auditory sense, and the amplitude is expressed in decibels. FIG. 4C, meanwhile, indicates 20 {1×T} size activity vectors that configure the respective rows of the activity matrix U in a normalized state.

Here, a {F×T} size amplitude spectrogram |Yi| for each base is obtained as indicated in Formula (2) by multiplying the base spectrum and activity vectors from identical base numbers. Note that (:,i) indicates an operation for extracting the ith column of the matrix and (i,:) indicates an operation for extracting the ith row of the matrix.

$$|Yi| = H(:,i) \cdot U(i,:) \quad [i=1\sim K] \quad (2)$$

Furthermore, a {F×T} size complex spectrogram Yi for each base is obtained as indicated in Formula (3) by multiplying the amplitude spectrogram |Yi| for each base by the phase components of the complex spectrogram Y. Here, "·" indicates the products for each element of the matrix, whereas j indicates an imaginary unit. Furthermore, arg(Y) indicates a matrix in which a complex number of arguments are found for each element in Y.

$$Yi = |Yi| \cdot \exp(j \cdot \arg(Y)) \quad [i=1\sim K] \quad (3)$$

A restored signal yi [i=1~K] for each base can then be generated by performing inverse time-frequency conversion on the complex spectrogram Yi for each base. Specifically, the complex spectrogram is symmetrically restored to a sampling frequency, after which an inverse Fourier transform is executed on a column-by-column basis, obtaining a restored signal for each time frame; thus the signals may be windowed and overlap addition carried out thereon.

FIG. 4D illustrates 20 restored signals for respective bases in normalized states. Comparing the target sound waveforms shown at the top of FIG. 4D, it can be seen that of waveforms corresponding to target sounds and noise, base numbers 4, 16, and so on are examples that correspond to target sounds. Accordingly, if, for example, a person views and listens to the restored signals for respective bases, it appears that each base can be classified into target sounds and noise with high precision; however, according to the present embodiment, this is carried out automatically by calculating an index whose physical meaning is clear from the respective base spectra, which will be described below.

In S303, the signal analysis processing unit 103 sorts the base numbers based on the evaluation index calculated from each base spectrum. This is based specifically on the notion that the wind noise base spectrum is prevalent in low bands, whereas the speech base spectrum is distributed across a wide frequency range throughout the mid and high bands. Accordingly, in the first embodiment, in order to quantify the distribution of the base spectra on the frequency axis, a barycentric frequency in the frequency distribution in each base spectrum is calculated as a base spectrum evaluation index.

First, the base spectra are expressed as decibels in order to express the base spectra as shown in FIG. 4B. However, minute values turning into large negative values as a result of being expressed in decibels is problematic, and thus values less than a maximum value of −60 dB in the basis matrix are rounded up to the maximum value of −60 dB. The values are then normalized in a range from 0 to 1, for example, after which octave smoothing is carried out in order to obtain amplitude values at equal intervals along a logarithmic frequency axis.

When a base spectrum expressed in this manner is taken as h and a number of sample points at equal intervals in a target frequency range (50-3 kHz, for example) on the logarithmic frequency axis is taken as s (=0~), a sample point number sg corresponding to the barycentric frequency can be calculated as indicated by Formula (4). Note that h(s) expresses a value of a sample point number s in a base spectrum h, and $\Sigma$ indicates an operation for finding a sum for s.

$$sg=\Sigma(s \cdot h(s))/\Sigma(h(s)) \quad (4)$$

sg as calculated through Formula (4) is typically a fractional value, and a value corresponding thereto on the logarithmic frequency axis serves as the barycentric frequency.

The black circles in FIG. 4B schematically indicate the barycentric frequency found as described above for each base spectrum shown in FIG. 4B, and FIG. 4A illustrates the barycentric frequency values as bar graphs. Based on these diagrams, it can be seen that the base spectra of base numbers 4 and 16, which were predicted to correspond to target sound, are distributed over a wide frequency range, and the center frequencies thereof are higher than others.

Figure 5A:
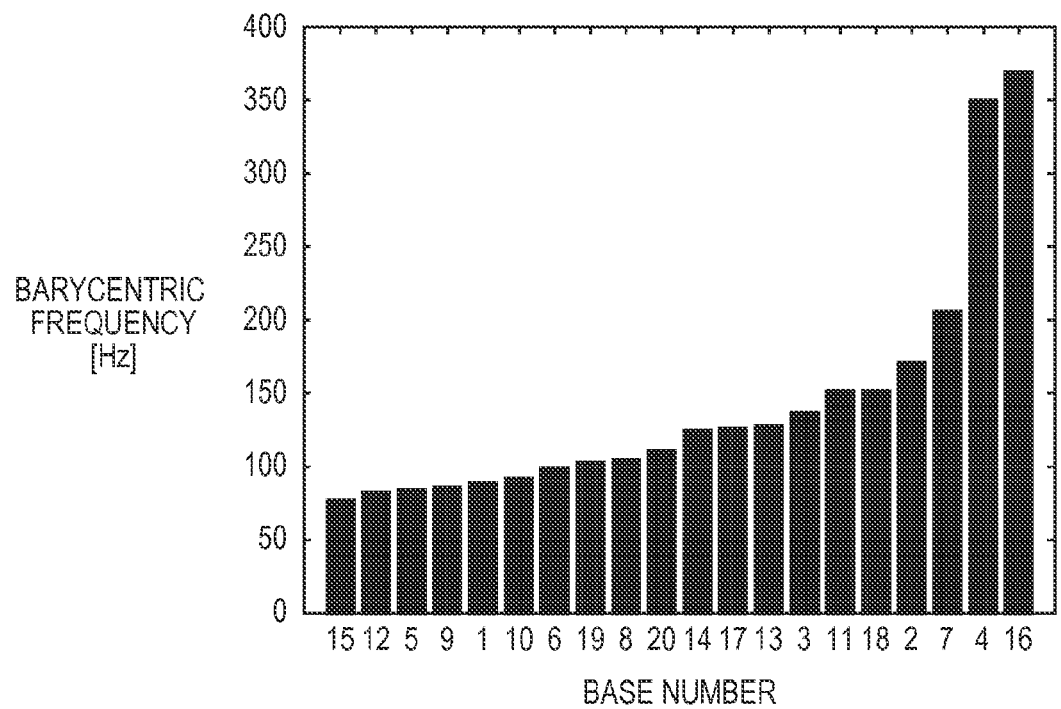
FIGS. 5A and 5B are diagrams illustrating the sorting of base numbers and the SNR of a target sound-restored signal according to the first embodiment.

FIG. 5A is a diagram illustrating the base spectra sorted in ascending order of barycentric frequency in accordance with the center frequencies shown in FIG. 4A, with the horizontal axis representing the sorted base numbers. Here, the further toward the left a base number is, the lower the barycentric frequency is in the base spectrum, and thus is more likely to correspond to wind noise, which is prevalent in lower bands. On the other hand, the further toward the right a base number is, the higher the barycentric frequency is, and thus is more likely to correspond to speech, whose base spectrum is distributed throughout a wide frequency range.

In S304, the signal analysis processing unit 103 classifies the base spectra into target sound base spectra, serving as first base spectra, and non-target sound base spectra (also called noise base spectra), serving as second base spectra. The audio restored signal is then generated using the classified base spectra. First, the signal analysis processing unit 103 rearranges each column (base spectrum) of the basis matrix H based on the base number sorted in S303. That is, the 20 base spectra are rearranged based on the result of sorting indicated in FIG. 5A, with the 15th column of the original basis matrix being taken as the first column of the rearranged basis matrix, the 12th column of the original basis matrix being taken as the second column of the rearranged basis matrix, and so on. The rows (activity vectors) in the activity matrix U are rearranged in the same manner.

In this manner, rearranging the basis matrix based on the sorted base number makes it possible to classify the base spectra into target sound base spectra and noise base spectra by determining a target sound basis number or a noise basis number thereafter. In other words, if a noise base number is taken as Kn, the base spectra from the first column to the Knth column of the rearranged basis matrix H are classified as noise base spectra and the base spectra from the Kn+1th column to the Kth column are classified as target sound base spectra. Then, a noise basis matrix Hn configured of the noise base spectra and a target sound basis matrix Hs configured of the target sound base spectra are obtained through Formulas (5) and (6), respectively. Note that (:,1: Kn) expresses an operation for extracting the first to Knth columns of the matrix and (:,Kn+1:K) expresses an operation for extracting the Kn+1th to Kth columns of the matrix.

$$Hn=H(:,1:Kn) \quad (5)$$

$$Hs=H(:,Kn+1:K) \quad (6)$$

Like the base spectra, the activity vectors are classified into target sound activity vectors serving as first activity vectors and noise activity vectors (non-target sound activity vectors) serving as second activity vectors. A noise activity matrix Un configured of the noise activity vectors and a target sound activity matrix Us configured of the target sound activity vectors are obtained as indicated by Formulas (7) and (8), respectively. Note that (1:Kn,:) expresses an operation for extracting the first to Knth rows of the matrix and (Kn+1: K,:) expresses an operation for extracting the Kn+1th to Kth rows of the matrix.

$$Un=U(1:Kn,:) \quad (7)$$

$$Us=U(Kn+1: K,:) \quad (8)$$

Assuming a target sound base number of Ks (=K−Kn), a {F×T} size target sound amplitude spectrogram |Ys| is obtained as indicated in Formula (9) by multiplying the {F×Ks} size target sound basis matrix Hs and the {Ks×T} size target sound activity matrix Us.

$$|Ys|=Hs \cdot Us \quad (9)$$

Furthermore, a {F×T} size target sound complex spectrogram Ys is obtained as indicated in Formula (10) by multiplying phase components of the complex spectrogram Y.

$$Ys=|Ys| \cdot \exp(j \cdot \arg(Y)) \quad (10)$$

Then, a target sound-restored signal ys can be generated as the audio restored signal by performing inverse time-frequency conversion on the target sound complex spectrogram Ys. Note that a noise restored signal yn can be generated in the same manner as the audio restored signal using a {F×Kn} size noise basis matrix Hn and a {Kn×T} size noise activity matrix Un.

Figure 5B:
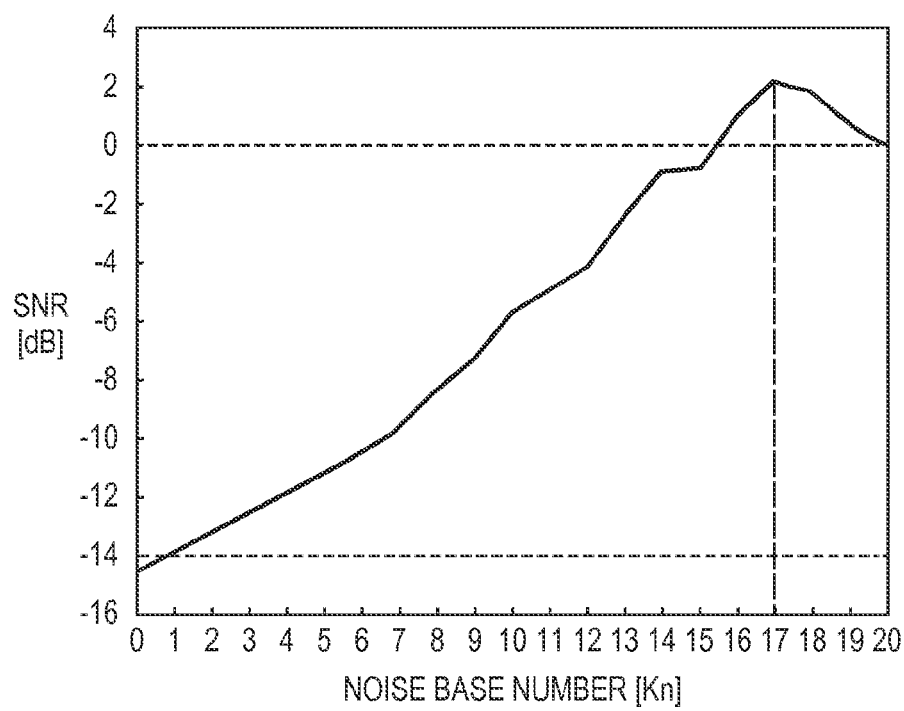

FIG. 6A illustrates respective target sound-restored signals when the noise base number is increased from 0 to 20. From FIG. 6A, it can be seen that more wind noise is removed and more speech is restored as the noise base number Kn increases, or in other words, as the target sound base number Ks is narrowed down. Meanwhile, FIG. 5B is a graph illustrating a relationship between the noise base number and the SNR of the target sound-restored signal, and the SNR is at a maximum of 2.21 dB when the noise base number Kn=17 (the target sound base number Ks=3). At this time, it can be seen from FIG. 5A that the base numbers 16, 4, and 7 are being used. However, based on FIG. 5B, if the noise base number is increased and the target sound base number narrowed down further, the SNR will drop. Accordingly, setting the target sound base number or the noise base number correctly is considered important.

Figure 7A:
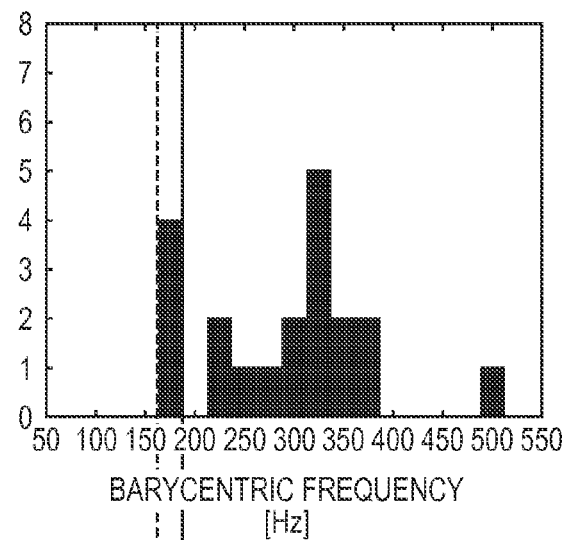
FIGS. 7A to 7C are diagrams illustrating the classification of base spectra according to an embodiment.
Figure 7B:
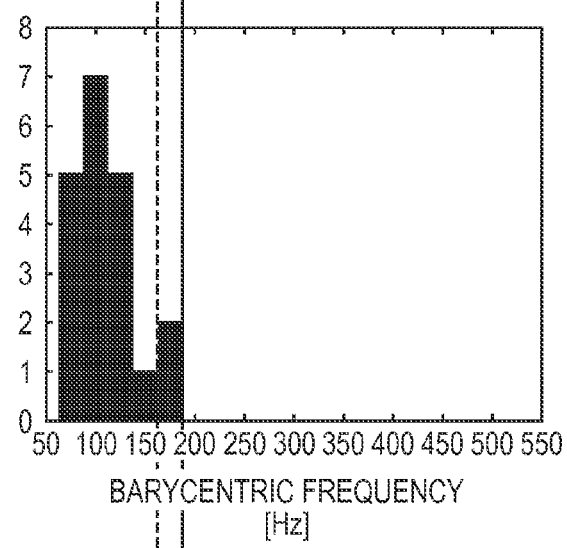
Figure 7C:
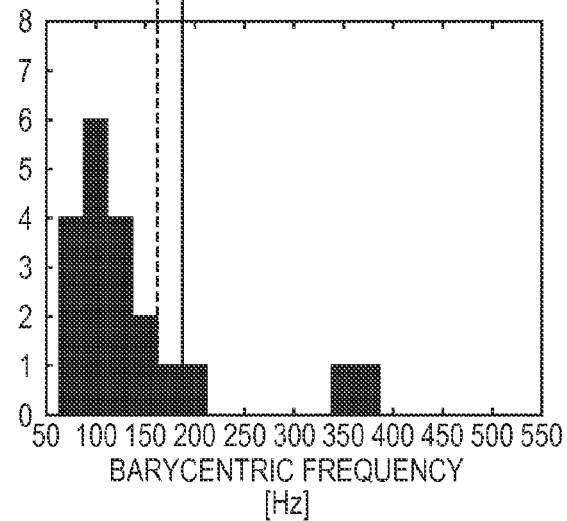

Because the barycentric frequency is in units of Hz and is thus an index having a clear physical meaning, the target sound base number may be set by using a threshold of 200 Hz, for example, and setting the number of base spectra in which the barycentric frequency is greater than or equal to the threshold may as the target sound base number. FIG. 7C illustrates FIG. 4A as a histogram and shows a barycentric frequency distribution, which is divided as indicated by the solid line in FIG. 7C when the threshold is set to 200 Hz, resulting in a target sound base number of three. Meanwhile, the histogram in FIG. 7C may be viewed as a contaminated normal distribution, and the target sound base number may then be determined by classification into two groups using an EM algorithm.

In addition, speech and wind noise may be prepared separate from the audio signal, and a histogram of center frequencies found from the speech and wind noise may then be used. For example, taking into consideration the range of a histogram obtained from an audio signal of only wind noise as shown in FIG. 7B, a target sound base number of 3 is obtained when FIG. 7C is divided by the solid line shown in FIGS. 7A to 7C. Alternatively, taking into consideration the range of a histogram obtained from an audio signal of only speech as shown in FIG. 7A, a target sound base number of 4 is obtained when FIG. 7C is divided by the dotted line shown in FIGS. 7A to 7C. Although this method appears similar to the advance training discussed in the first technique described in the related art, the method is different because the target sound or noise prepared separately is only used to determine the target sound base number or the noise base number and the basis matrix is obtained from the audio signal.

Note that a user may be capable of adjusting the target sound base number or the noise base number via an input/output GUI unit (not shown; configured of a touch panel, for example) interconnected with the system control unit 101.

The target sound-restored signal generated having appropriately set the target sound base number or the noise base number is then recorded into the storage unit 102. The recorded target sound-restored signal is output to the exterior via the audio signal input/output unit 104, played back through earphones, headphones, a speaker, or the like (not shown) after undergoing D/A conversion and amplification, or the like.

Second Embodiment

Although in the first embodiment, the barycentric frequency is calculated as an evaluation index from the respective base spectra in 5303, the calculation of the evaluation index is not limited thereto. The second embodiment describes an example in which the evaluation index is calculated from a cepstrum obtained by converting a base spectrum (called a "base cepstrum" hereinafter).

The base cepstrum is obtained as the real part of the result of an inverse Fourier transform of the logarithm found for a base spectrum symmetrically restored up to a sampling frequency. FIG. 8C illustrates normalized base cepstra found from the respective base spectra in FIG. 8B, where the horizontal axis represents a quefrency having a time dimension. Note that FIGS. 8B and 8D are the same as FIGS. 4B and 4D, respectively.

In FIG. 8C, the base cepstrum for base number 4, 16, and so on have low-quefrency portions that spike, as indicated by the dotted line circles 811 and 812. The low-quefrency portion of a cepstrum typically corresponds to an envelope component of a spectrum, and the magnitude of the envelope component of a spectrum can be thought of as indicating the spread of the spectrum. In reality, base numbers 4, 16, and so on, in which the low-quefrency portion of the base cepstrum spikes, the base spectra can be confirmed as being distributed over a wide frequency range, as indicated by dotted line circles 801 and 802 in FIG. 8B. Note that the "low-quefrency portion" refers to a portion where the quefrency is below a predetermined value, and in the present embodiment, is a portion of 2 ms or less, for example.

Accordingly, in the second embodiment, an evaluation index for quantifying the distribution of a base spectrum on the frequency axes is calculated from the corresponding base cepstrum in S303. For example, to quantify the magnitude of an envelope component expressing the spread of a base spectrum, the maximum value of a portion of the base cepstrum that is less than a predetermined quefrency is used as the evaluation index. More simply put, based on FIG. 8C, the maximum value of the low-quefrency portion in the base cepstrum can be taken as the maximum value of the overall base cepstrum without issue, and may therefore be used as the evaluation index.

Figure 9A:
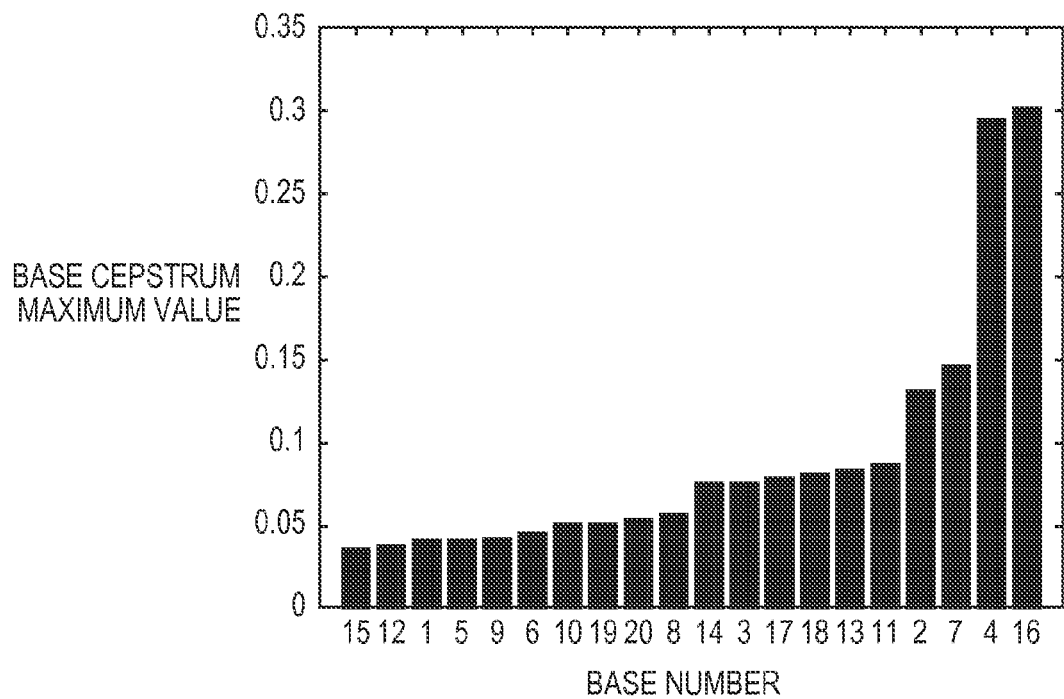
FIGS. 9A and 9B are diagrams illustrating the sorting of base numbers and the SNR of a target sound-restored signal according to the second embodiment.

FIG. 8A illustrates bar graphs for the maximum values of the overall base cepstrum for each base cepstrum in FIG. 8C, and FIG. 9A illustrates these being sorted in ascending order. In FIG. 8A, the envelope component of the base spectrum is greater the farther to the right the bar graph indicating the base number extends, and thus is highly likely to be speech in which the base spectrum is distributed across a wide frequency range. Conversely, the envelope component of the base spectrum is lower the farther to the left the bar graph indicating the base number is constrained, and is thus likely to be wind noise whose base spectrum is concentrated in a narrow frequency range (a low band).

Figure 9B:
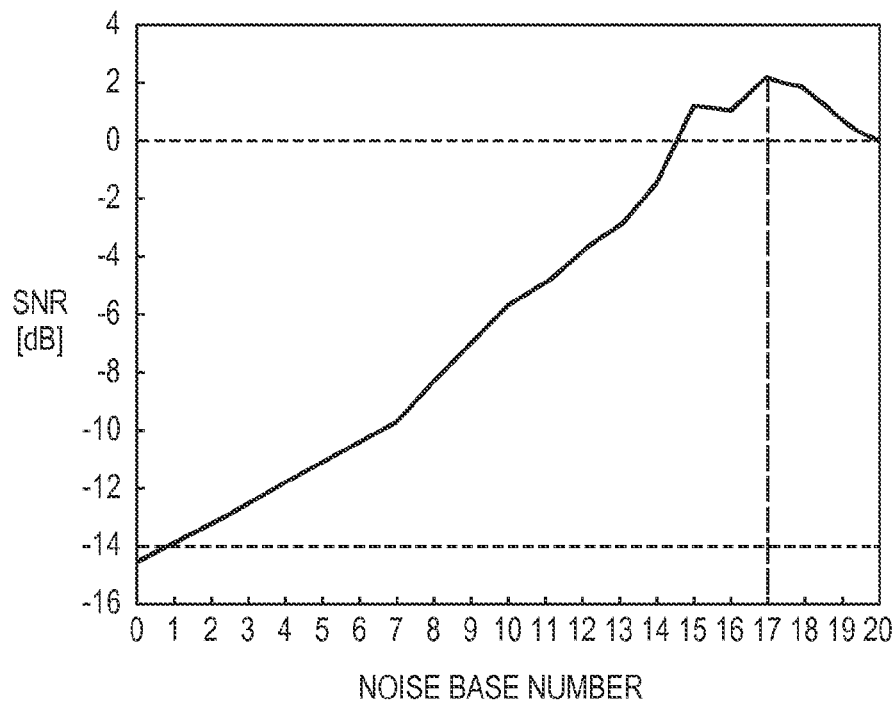

Here, both the first embodiment and the second embodiment are based on the concept of quantifying the distribution of the base spectra along the frequency axis. As such, the bar graphs in FIGS. 5A and 9A have similar overall trends, and the orders in which the sorted base numbers are arranged resemble each other as well. In particular, the top four numbers (16, 4, 7, and 2) are the same in each. Accordingly, FIG. 9B, which illustrates a relationship between the noise base number and the SNR of the target sound-restored signal according to the second embodiment, has a maximum SNR of 2.21 dB when the noise base number is 17 (the target sound base number is 3) as in FIG. 5B.

Note that in the case where division is carried out based on the evaluation index value using the solid line, the dotted line, and so on in FIGS. 7A to 7C when determining the target sound base number or the noise base number in S304, it is desirable for the value of the evaluation index to be dependent on the magnitude of the audio signal. Although the barycentric frequency by nature does not depend on the magnitude of the audio signal in the first embodiment, the magnitudes of the base spectra, the base cepstra, and the like do generally depend on the magnitude of the audio signal. Accordingly, if the basis matrix H is normalized in the non-negative matrix factorization indicated in Formula (1), the base spectra, the base cepstra, and so on will no longer depend on the magnitude of the audio signal, and the evaluation indices calculated from the base cepstra will also no longer depend on the magnitude of the audio signal, which is preferable.

Note that the flowchart is also the same as that shown in FIG. 3 and described in the first embodiment, with the exception of the process of S303.

Third Embodiment

In the first and second embodiments, an evaluation index that quantifies the distribution of the base spectrum along the frequency axis is used in S303. However, based on the concept that harmonic components are greater in the base spectra of speech than in the base spectra of wind noise, the third embodiment quantifies the magnitude of such harmonic components and calculates evaluation indices from the respective base cepstra.

The peak of a cepstrum generally indicates the magnitude of a harmonic component of the spectrum and the basic frequency thereof. For example, if a cepstrum has a peak where the quefrency is 5 ms, the spectrum has a harmonic component whose basic frequency is the inverse of the quefrency, namely 200 Hz.

Because the magnitude of the peak of the base cepstrum can be examined in order to quantify the magnitude of the harmonic component of a base spectrum, it is thought that the maximum value of the base cepstrum can be calculated with ease. However, as described in the second embodiment, the maximum value of the base cepstrum as a whole actually corresponds to the maximum value of the low-quefrency portion, and thus the distribution of the base spectrum along the frequency axis is ultimately being employed. Accordingly, in the third embodiment, the magnitude of a harmonic component is quantified and taken as the evaluation index by finding the maximum value of a portion of the base cepstrum that corresponds to the basic frequency range of speech.

FIG. 10C illustrates portions, of base cepstra found from the respective base spectra shown in FIG. 10B, corresponding to the basic frequency range of speech, which is 100 to 400 Hz, or in other words, portions corresponding to a quefrency of 2.5 to 10 ms, in an enlarged manner. Note that FIGS. 10B and 10D are the same as FIGS. 4B and 4D, respectively.

As indicated by the dotted line circles 1001 to 1004 in FIG. 10C, base cepstra predicted to correspond to target sound, such as base number 4, 16, and so on, have peaks in portions corresponding to the basic frequency range of speech, and such peaks can also be seen in the base cepstra of base numbers 7, 11, and so on.

FIG. 10A illustrates bar graphs for the maximum values of each base cepstrum shown in FIG. 10C, which are portions corresponding to the basic frequency range of speech, and FIG. 11A illustrates these being sorted in ascending order. In FIG. 11A, the further toward the right a base number is, the greater the harmonic component of the base spectrum is, which is more likely to correspond to speech; conversely, the further toward the left a base number is, the lower the harmonic component of the base spectrum is, which is more likely to correspond to wind noise. Note that when the top four (numbers 7, 4, 11, and 16) are viewed as a set, it can be seen that 11 is included instead of 2 as in the first and second embodiments.

FIG. 11B is a graph illustrating a relationship between the noise base number and the SNR of the target sound-restored signal according to the present embodiment. The present embodiment differs slightly from the first and second embodiments, with the SNR being highest, at 2.98 dB, when the noise base number is 16 (the target sound base number is 4); this is higher than the 2.21 dB of the first and second embodiments. This thought to be because the base number 11 is being used, as mentioned above. In particular, it can be seen that by adding the portion corresponding to a dotted line circle 1011 indicated in the restored signal for each base shown in FIG. 10D, a speech portion corresponding to a dotted line circle 611 has been restored in FIG. 6B, which illustrates the target sound-restored signal according to the third embodiment, as compared to FIG. 6A.

The second technique discussed in the related art involves a process for synthesizing the target sound-restored signal by extracting harmonic components from a noise restored signal, but such a process is considered to be necessary particularly in cases where the target sound base spectra have been classified as noise base spectra. The third embodiment differs from this technique in that such misclassifications are prevented by employing the harmonic component magnitude as the evaluation index used to classify the base spectrum.

Although the time block length has been described as being three seconds, a shorter time block length of 0.3 seconds, for example, may be used in the third embodiment in order to obtain a base spectrum for each phoneme (and preferably, each vowel) in the speech. This reduces the size of the matrices in the non-negative matrix factorization, which in turn shortens calculation times.

Note that the flowchart is also the same as that shown in FIG. 3 and described in the first embodiment, with the exception of the process of S303.

Next, how the base spectrum can be classified according to each embodiment in the case where a small amount of speech is intermixed with wind noise in the base spectrum will be considered. As the general form of a base spectrum, lower bands, in which the wind noise is prevalent, are dominant; thus in the first embodiment, the barycentric frequency is low and thus classification as a noise base spectrum is highly likely. Furthermore, a base spectrum is concentrated in a narrow frequency range (low bands), and the envelope component of the base spectrum is low; thus it is thought that the base spectrum will be classified as a noise base spectrum in the second embodiment as well. However, in the third embodiment, the harmonic components of speech are included as well, and thus the base spectrum may be classified as a target sound base spectrum. Accordingly, a method that looks at the distribution of the base spectrum along the frequency axis, as in the first embodiment and the second embodiment, can be interpreted as a method that prioritizes noise removal. On the other hand, a method that looks at the harmonic components contained in a base spectrum, as in the third embodiment, can be interpreted as a method that prioritizes saving the target sound, and this difference in priorities is thought to appear in the SNR value of the target sound-restored signal as well.

Although the foregoing embodiments have described the target sound as speech and the noise as wind noise, it goes without saying that the present invention can also be applied to other combinations of sounds. The methods of the first embodiment and the second embodiment can be applied as long as the distributions of the base spectra along the frequency axis are different, even if, for example, the strength of the harmonic components is the same in both the target sound and the noise; as such, these methods can be applied in cases such as where the target sound is murmuring and the noise is road noise from cars, for example. Meanwhile, the method of the third embodiment can be applied as long as the magnitudes of the harmonic components in the base spectra are different, even if the frequency bands of the target sound and the noise overlap, for example. Accordingly, the methods can be applied to combinations such as a target sound having a harmonic component such as speech, a birdsong, or the like and noise such as buzzing, and can also be used for sound combinations such as harmonic instruments and percussion instruments. By using a method that looks at the distribution of a base spectrum along the frequency axis and a method that looks at the harmonic components contained in a base spectrum in this manner, the present invention can handle a variety of sound combinations.

Note that noise may be removed from the original audio signal using at least one of the target sound-restored signal and the noise restored signal. For example, the noise removal may be carried out by subtracting the spectrum of the noise restored signal from the audio signal, or a Weiner filter generated from the target sound-restored signal and the noise restored signal may be applied to the audio signal.

Note that if noise is thought of as another type of target sound, the present invention can also be used in sound source separation instead of noise removal. Furthermore, it is also possible to separate the audio signal into three or more sounds by dividing the sorted base number into three or more rather than two. It goes without saying that the processing of the present invention can also be applied per-channel on multichannel audio signals.

In the aforementioned embodiments, the basis matrix and the activity matrix are obtained through non-negative matrix factorization on the amplitude spectrogram |Y| of the audio signal; however, the present invention is not limited thereto. For example, the complex spectrogram Y of the audio signal can be separated into a basis matrix, an activity matrix, and K {FxT} size phase spectrograms Pi (i=1~K) by using complex NMF. At this time, a target sound complex spectrogram Ys is calculated as indicated by Formula (11), for example. Here, $\Sigma$ represents an operation for finding a sum of Ks number of i corresponding to a target sound.

$$Ys = \Sigma(H(:,i) \cdot U(i,:) \cdot Pi) \quad (11)$$

Although the amplitude spectrogram |Y| has been described as having the absolute values of complex numbers for each element in the complex spectrogram Y, the amplitude spectrogram |Y| may instead have an exponential multiplier (for example, 0.5×, 2×, or the like) of the absolute values. Furthermore, in the time-frequency conversion, a wavelet transform may be used instead of a Fourier transform, and in such a case, a scalogram is used instead of the amplitude spectrogram.

As described thus far, according to the foregoing embodiments, an index having a clear physical meaning is calculated from each base spectrum in an audio signal and the base spectra are classified as target sound or noise using the calculated index, and thus noise can be removed from the audio signal with a high level of accuracy. Furthermore, the noise can be removed with a high level of accuracy from a single audio signal without using a teacher basis.

Other Embodiments

Although exemplary embodiments have been described in detail above, the present invention can also be carried out as a system, apparatus, method, program, recording medium (storage medium), and so on. Specifically, the present invention may be applied to a system configured of multiple devices (for example, a host computer, an interface device, an image capturing device, a web-based application, or the like) or to an apparatus configured of a single device.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)TM), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-237353, filed Nov. 15, 2013, which is hereby incorporated by reference herein in its entirety.

What is claimed is:

1. An audio signal processing apparatus comprising:
at least one processor programmed to function as:
an obtaining unit configured to apply non-negative matrix factorization on an audio signal which includes a target sound and non-target sound and to obtain a plurality of base spectra constituting rows of a basis matrix as a result of the non-negative matrix factorization;
a classifying unit configured to classify the plurality of base spectra into first base spectra corresponding to the target sound and second base spectra corresponding to the non-target sound based on a distribution of the base spectra along a frequency axis, wherein the classifying unit classifies a base spectrum, which has a component in a frequency band lower in the frequency axis than a base spectrum that is classified into the first base spectrum, into a second base spectrum; and an outputting unit configured to output the audio signal via an output device in which the non-target sound is reduced or removed using at least one of the first base spectra and the second base spectra, wherein the classifying unit classifies the base spectra into the first base spectra and the second base spectra based on a barycentric frequency in the distribution of the base spectra along the frequency axis.

2. The apparatus according to claim 1, wherein the classifying unit classifies the base spectra into the first base spectra and the second base spectra by comparing the barycentric frequency with a threshold.

3. An audio signal processing apparatus comprising:

at least one processor programmed to function as:

an obtaining unit configured to apply non-negative matrix factorization on an audio signal which includes a target sound and non-target sound and to obtain a plurality of base spectra constituting rows of a basis matrix as a result of the non-negative matrix factorization;

a classifying unit configured to classify the plurality of base spectra into first base spectra corresponding to the target sound and second base spectra corresponding to the non-target sound based on a distribution of the base spectra along a frequency axis, wherein the classifying unit classifies a base spectrum, which has a component in a frequency band lower in the frequency axis than a base spectrum that is classified into the first base spectrum, into a second base spectrum; and an outputting unit configured to output the audio signal via an output device in which the non-target sound is reduced or removed using at least one of the first base spectra and the second base spectra, wherein the classifying unit classifies the base spectra into the first base spectra and the second base spectra based on the values of low-quefrency portions, in which a quefrency is no greater than a predetermined value, in base cepstra found from the base spectra.

4. The apparatus according to claim 3, wherein the classifying unit classifies the base spectra into the first base spectra and the second base spectra by comparing the maximum values of the low-quefrency portions in the base cepstra with a threshold.

5. An audio signal processing apparatus comprising:

at least one processor programmed to function as:

an obtaining unit configured to apply non-negative matrix factorization on an audio signal which includes a target sound and non-target sound and to obtain a plurality of base spectra constituting rows of a basis matrix as a result of the non-negative matrix factorization;

a classifying unit configured to classify the plurality of base spectra into first base spectra corresponding to the target sound and second base spectra corresponding to the non-target sound based on a distribution of the base spectra along a frequency axis, wherein the classifying unit classifies a base spectrum, which has a component in a frequency band lower in the frequency axis than a base spectrum that is classified into the first base spectrum, into a second base spectrum; and an outputting unit configured to output the audio signal via an output device in which the non-target sound is reduced or removed using at least one of the first base spectra and the second base spectra, wherein the classifying unit classifies the base spectra into the first base spectra and the second base spectra based on the magnitude of harmonic components in the base spectra and the classifying unit determines the magnitude of the harmonic component of each base spectrum using a portion of a base cepstrum found from the base spectrum that corresponds to a predetermined basic frequency range.

6. The apparatus according to claim 5, wherein the classifying unit classifies the base spectra into the first base spectra and the second base spectra by comparing the maximum value of the portion of the base cepstrum that corresponds to the predetermined basic frequency range with a threshold.

7. The apparatus according to claim 1, further comprising:

an adjusting unit configured to adjust at least one of a first base number that is a number into which the first base spectra are classified and a second base number that is a number into which the second base spectra are classified.

8. The apparatus according to claim 1, further comprising:

a synthesizing unit configured to synthesize a first audio restored signal using first activities, of the plurality of activities, that correspond to the first base spectra.

9. The apparatus according to claim 1, further comprising:

a synthesizing unit configured to synthesize a second audio restored signal using second activities that correspond to the second base spectra.

10. The apparatus according to claim 9, wherein the non-target sound is removed from the audio signal using at least one of the first audio restored signal and the second audio restored signal.

11. The apparatus according to claim 1, wherein the obtaining unit separates the audio signal into basis matrices corresponding to the plurality of base spectra and activity matrices corresponding to the plurality of activities through non-negative matrix factorization.

12. A control method for an audio signal processing apparatus, the method comprising:

using at least one processor to perform the steps of:

applying non-negative matrix factorization on an audio signal which includes a target sound and non-target sound and obtaining a plurality of base spectra constituting rows of a basis matrix as a result of the non-negative matrix factorization;

classifying the plurality of base spectra into first base spectra corresponding to the target sound and second base spectra corresponding to the non-target sound based on a distribution of the base spectra along a frequency axis, wherein a base spectrum, which has a component in a frequency band lower in the frequency axis than a base spectrum that is classified into the first base spectrum, is classified into a second base spectrum; and outputting the audio signal via an output device in which the non-target sound is reduced or removed using at least one of the first base spectra and the second base spectra, wherein, in the classifying, the base spectra are classified into the first base spectra and the second base spectra based on a barycentric frequency in the distribution of the base spectra along the frequency axis.

13. A non-transitory computer readable storage medium storing a program for causing a computer to execute the steps of a control method, the method comprising:

applying non-negative matrix factorization on an audio signal which includes a target sound and non-target sound and obtaining a plurality of base spectra constituting rows of a basis matrix as a result of the non-negative matrix factorization;

classifying the plurality of base spectra into first base spectra corresponding to the target sound and second base spectra corresponding to the non-target sound based on a distribution of the base spectra along a frequency axis, wherein a base spectrum, which has a component in a frequency band lower in the frequency axis than a base spectrum that is classified into the first base spectrum, is classified into a second base spectrum; and outputting the audio signal via an output device in which the non-target sound is reduced or removed using at least one of the first base spectra and the second base spectra, wherein, in the classifying, the base spectra are classified into the first base spectra and the second base spectra based on a barycentric frequency in the distribution of the base spectra along the frequency axis.

14. The apparatus according to claim 1, wherein the target sound is speech and the non-target sound is wind noise.

\* \* \* \* \*